(12) United States Patent
Matthias (10) Patent No.: US 9,127,513 B2
(45) Date of Patent: Sep. 8, 2015

(54) VARIABLE GEOMETRY AUGER COUPLER

(75) Inventor: Eric Matthias, Spencer, IA (US)

(73) Assignee: Pengo Corporation, Laurens, IA (US)

(*) Notice: Subject to any disclaimer, the term of this patent is extended or adjusted under 35 U.S.C. 154(b) by 307 days.

(21) Appl. No.: 13/604,140

(22) Filed: Sep. 5, 2012

(65) Prior Publication Data

US 2013/0101344 A1   Apr. 25, 2013

Related U.S. Application Data

(60) Provisional application No. 61/548,911, filed on Oct. 19, 2011.

(51) Int. Cl.
| | | |
|---|---|---|
| *B25G 3/16* | (2006.01) | |
| *F16B 7/20* | (2006.01) | |
| *E21B 17/046* | (2006.01) | |
| *E21B 17/22* | (2006.01) | |

(52) U.S. Cl.
CPC .............. *E21B 17/046* (2013.01); *E21B 17/22* (2013.01); *Y10T 403/7007* (2015.01)

(58) Field of Classification Search
CPC ............ Y10T 403/551; Y10T 403/553; Y10T 403/5706; Y10T 403/5741; Y10T 403/7007; E21B 17/22; E21B 17/046
USPC ......... 403/293, 294, 296, 301, 306, 348, 349; 175/18, 323, 394
See application file for complete search history.

(56) References Cited

U.S. PATENT DOCUMENTS

| | | | | |
|---|---|---|---|---|
| 2,990,896 | A | * | 7/1961 | Kandle ................... 175/171 |
| 3,104,757 | A | * | 9/1963 | Dougherty et al. ...... 198/666 |
| 3,986,570 | A | * | 10/1976 | Stinson et al. .......... 175/320 |
| 4,248,313 | A | | 2/1981 | Bonca |
| 4,363,366 | A | * | 12/1982 | Hilty ....................... 175/314 |
| 4,750,571 | A | * | 6/1988 | Geeting ..................... 175/57 |
| 4,821,818 | A | | 4/1989 | Mefferd |
| 4,894,043 | A | | 1/1990 | Nixon |
| 5,967,693 | A | | 10/1999 | Braaten |
| 6,151,810 | A | * | 11/2000 | Mukai ........................ 37/350 |
| 6,290,606 | B1 | | 9/2001 | Hodson |
| 6,863,466 | B2 | | 3/2005 | Buhren |
| 7,669,673 | B1 | * | 3/2010 | Matthias et al. ......... 175/323 |
| 7,699,119 | B1 | | 4/2010 | Lunde |
| 7,712,712 | B2 | * | 5/2010 | Richter ..................... 248/161 |
| 8,197,155 | B2 | * | 6/2012 | Noh ........................... 403/348 |
| 2002/0066579 | A1 | | 6/2002 | Jasper |
| 2002/0164939 | A1 | | 11/2002 | Kuo |
| 2003/0032374 | A1 | | 2/2003 | Liang |
| 2010/0059985 | A1 | * | 3/2010 | Nielson ....................... 285/40 |

* cited by examiner

*Primary Examiner* — Gregory Binda
*Assistant Examiner* — Nahid Amiri
(74) *Attorney, Agent, or Firm* — Ryan N. Carter (57) ABSTRACT

An auger attachment system having a collar combined with an auger and one or more couplers each having a first end and a second end. The coupler first end is adapted to operatively combine with the output drive shaft of an engine suitable for rotating an auger. Each coupler has a different size and/or geometry at their respective first ends to allow each coupler to combine with a drive shaft having the corresponding size and geometry. The coupler second end is adapted to combine with the collar thereby allowing a single auger to be used with multiple drive shafts, each having a different size and/or geometry.

22 Claims, 8 Drawing Sheets

VARIABLE GEOMETRY AUGER COUPLER

This application is based upon and claims priority to U.S. Provisional Application Ser. No. 61/548,911 filed Oct. 19, 2011, the complete disclosure of which is hereby expressly incorporated by this reference.

BACKGROUND

Earth auger attachments are one of the many different useful attachments for commercial work vehicles such as skid steer loaders and tractors. An earth auger attachment is used to quickly dig relatively deep cylindrical holes in the ground for any of a variety of purposes, such as mounting wooden poles. The earth auger attachment is typically powered by the commercial work vehicle using a hydraulic or gasoline powered engine that rotates an output drive shaft.

One of the difficulties for users is that there are several different types and sizes of output drive shafts used with these engines. For example, some have hexagonal output drive shafts and others have cylindrical output drive shafts. The drive shafts are received in correspondingly shaped sockets in the augers. Since each auger has a dedicated socket that can only be used with one type of output drive shaft, users are required to purchase multiple augers to fit the different drive shaft geometries.

There is therefore a need for an auger system having multiple couplers each adapted to receive different output drive shaft geometries on a first end while having the same geometry on a second end for combining with earth augers.

SUMMARY

The present invention relates to an auger attachment system having a collar combined with an auger and a coupler with a first end and a second end. The coupler first end is adapted to operatively combine with the output drive shaft of an engine suitable for rotating the auger. In some embodiments, the system includes several different couplers, each having a different geometry at their respective first ends to allow each coupler to combine with a drive shaft having the corresponding geometry (e.g. a first exemplary coupler may have a generally cylindrical opening at its first end adapted to receive a cylindrical drive shaft and a second exemplary coupler may have a generally hexagonal opening at its first end adapted to receive a hexagonal drive shaft). The coupler second end is adapted to combine with the collar thereby allowing a single auger to be used with multiple drive shafts having different geometries. In other words, the second end of both of the exemplary couplers discussed above could combine with the collar of the auger. In use, the user can attached the first or second coupler to the auger/collar depending on the geometry of the drive shaft.

DETAILED DESCRIPTION

Figure 1:
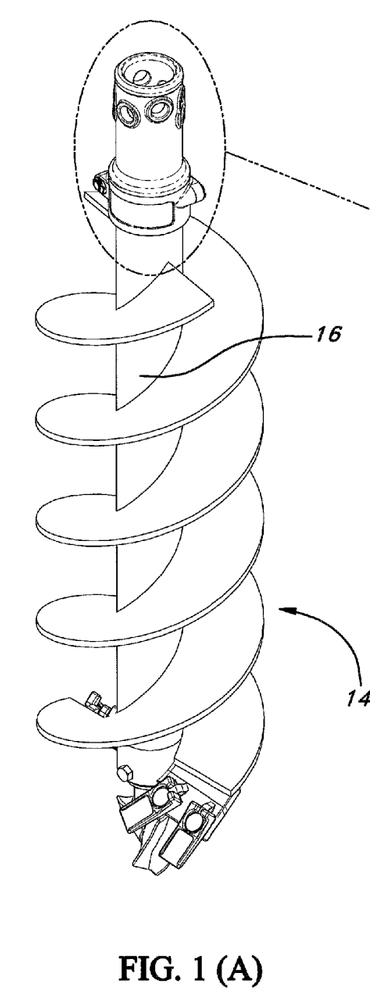
FIG. 1 is an exploded view showing how the coupler and collar combine with an auger.
Figure 2:
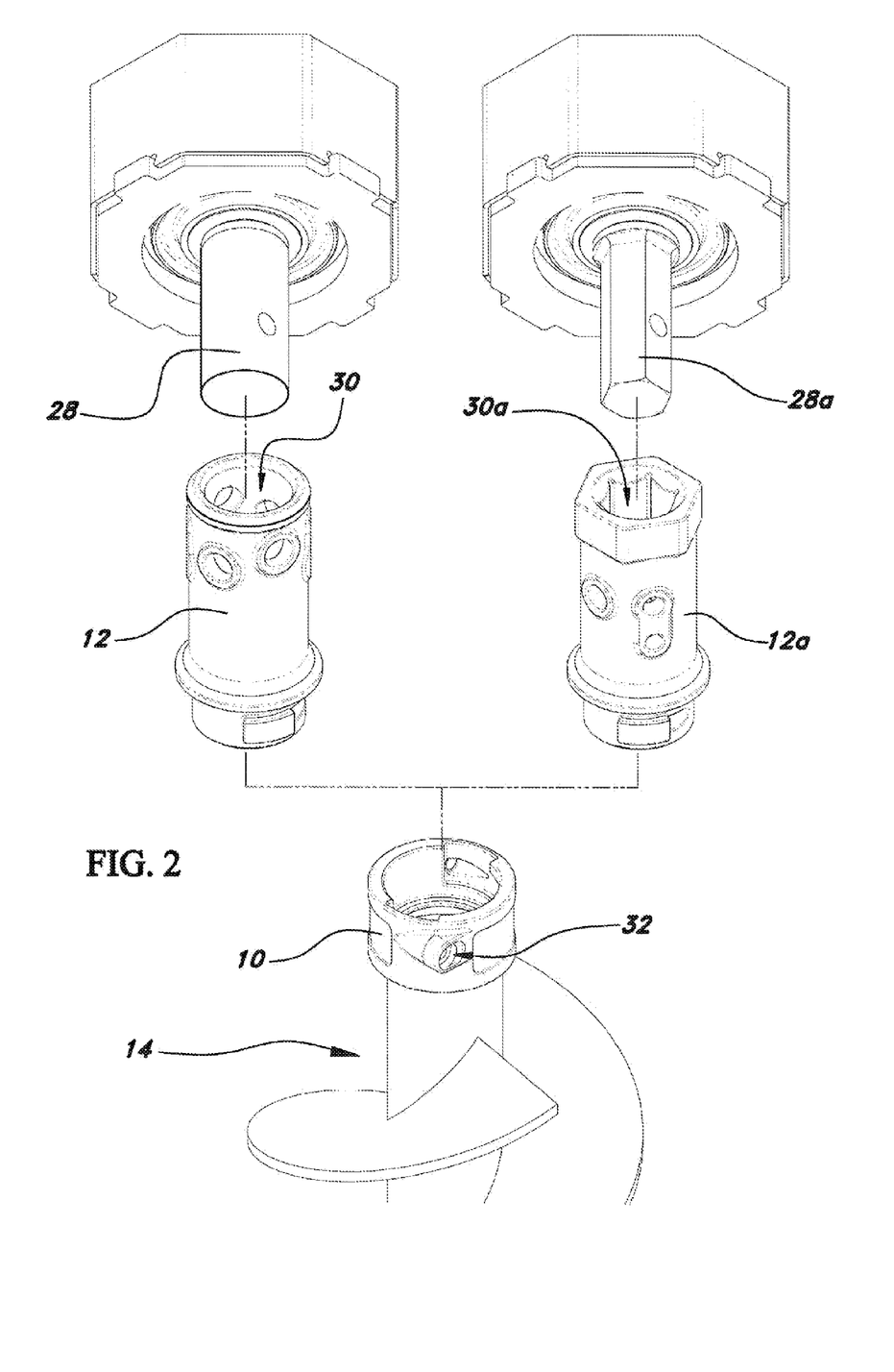
FIG. 2 is a perspective view illustrating how multiple couplers can combine with one collar.
Figure 3:
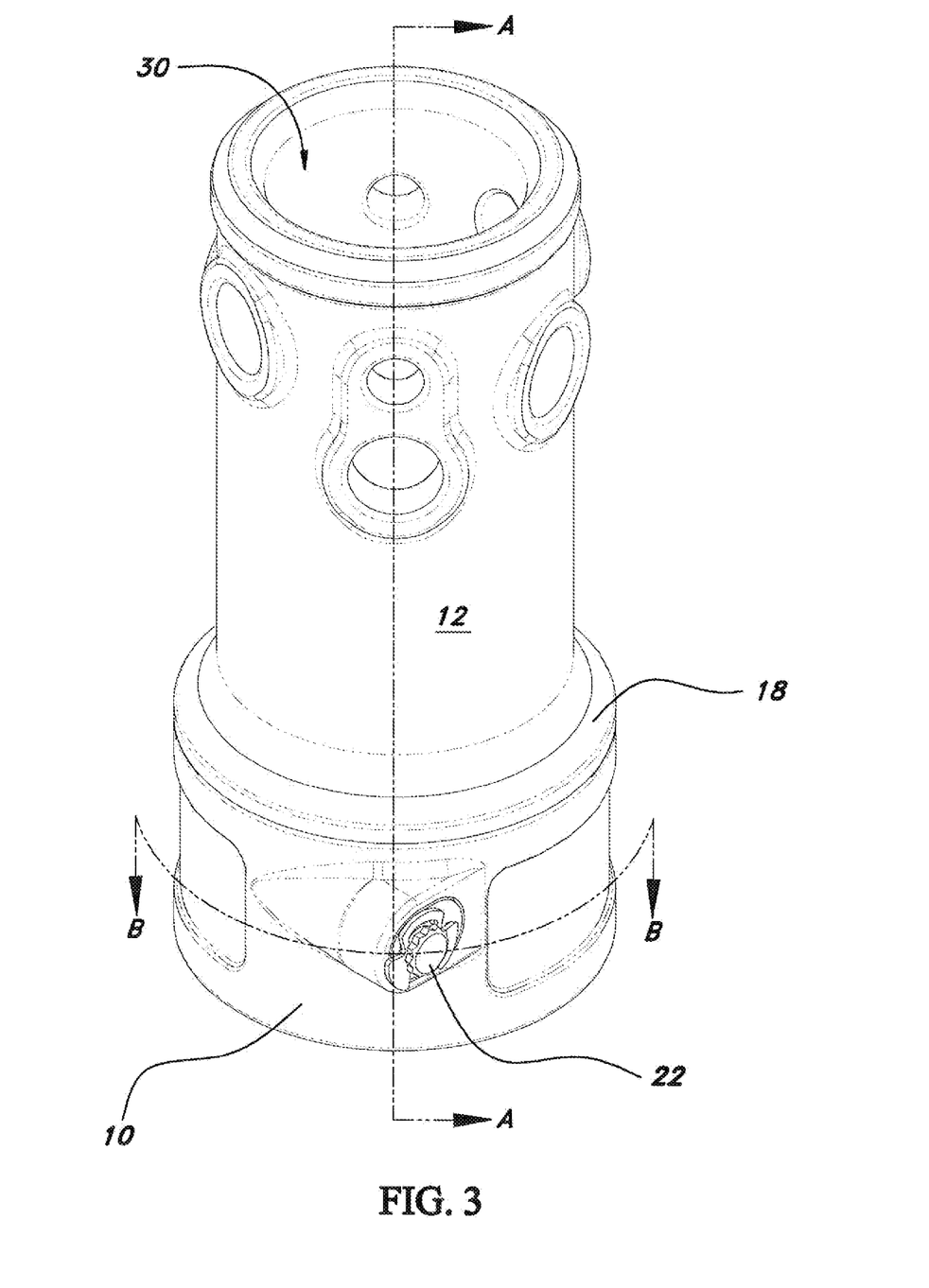
FIG. 3 is a perspective view of the coupler combined with the collar.
Figure 7:
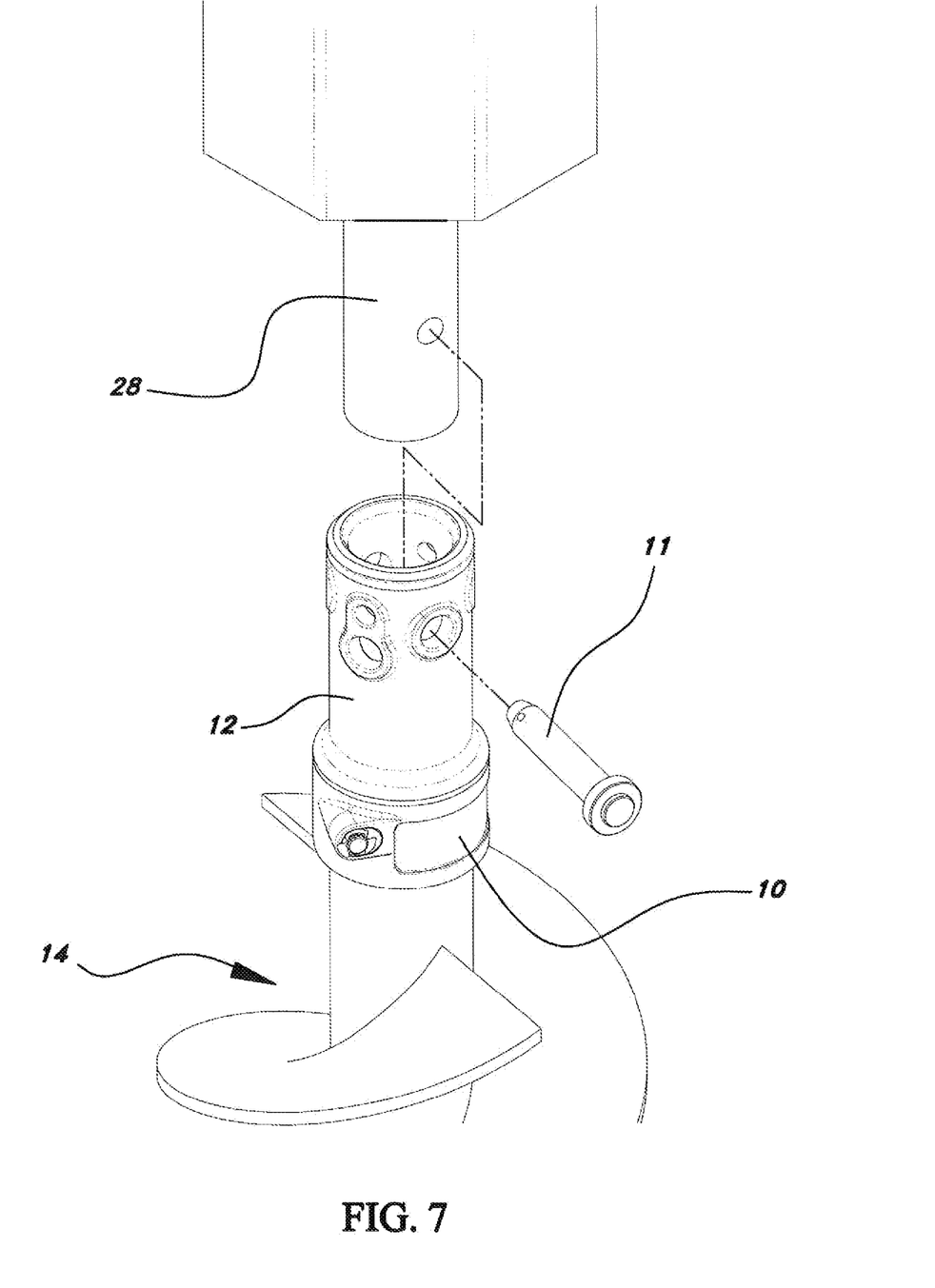
FIG. 7 is a perspective view showing an exemplary attachment member used to combine the coupler with the drive shaft.

The present invention relates to an auger attachment system having one or more couplers 12, 12 a each with a first end and a second end. As shown in FIGS. 1(A) and 1(B), the system generally includes a coupler 12 adapted to combine with a collar 10 that is permanently secured to an auger 14. As shown in FIG. 2, the coupler 12, 12 a first end has an opening 30, 30 a adapted to receive the output drive shaft 28, 28 a of an engine suitable for rotating an auger 14. The coupler 12, 12 a is removably combined with the output drive shaft 28, 28 a by any suitable means, including an attachment member 11 (FIG. 7) such as a locking pin, screw, or bolt adapted to be received by openings in the coupler 12, 12 a and output drive shaft 28, 28 a. In some embodiments, the system includes several different couplers 12, 12 a each having an opening 30, 30 a with a different geometry and/or size to allow each coupler 12, 12 a to combine with a drive shaft 28, 28 a having the corresponding geometry and size. The geometries of the openings 30, 30 a may be the shape and size of any drive shaft 28, 28 a being commercially produced, including cylindrical, hexagonal, and square.

Figure 5:
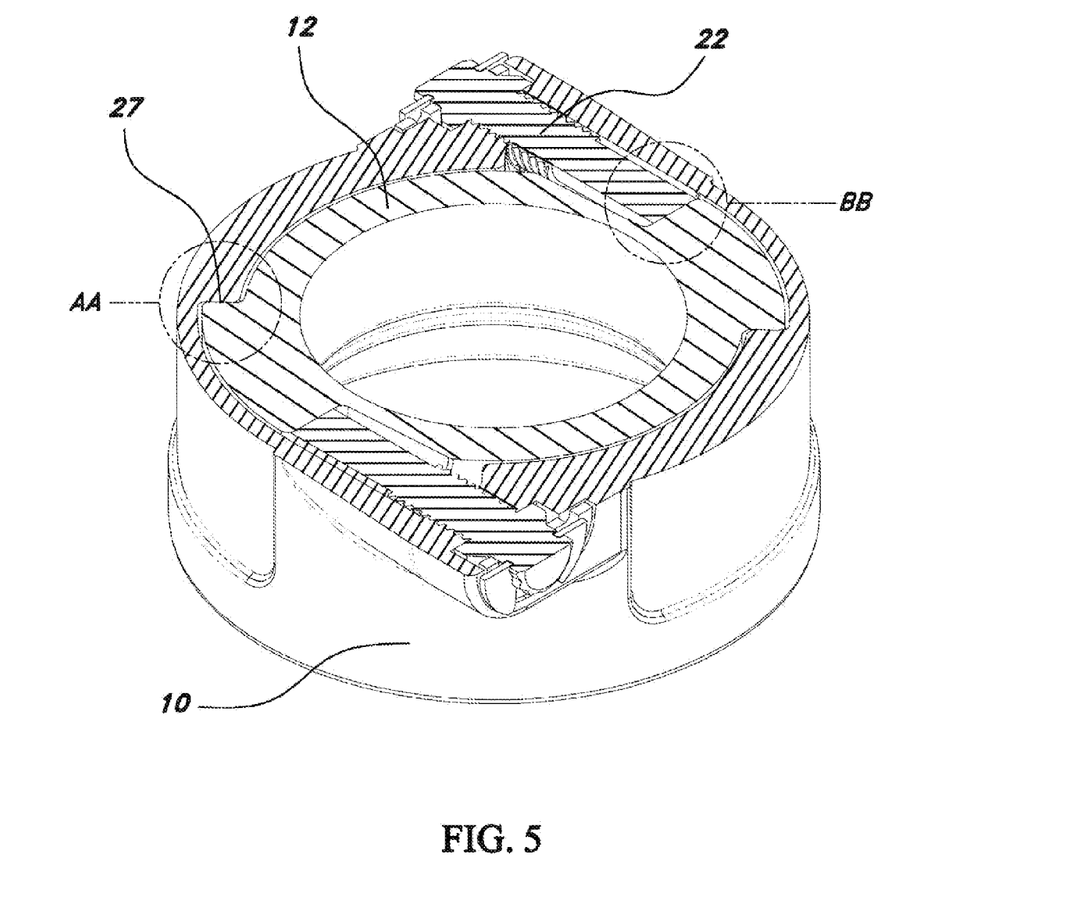
FIG. 5 is a section view taken along line B-B of FIG. 3.

As shown in FIGS. 1(A), 1(B), and 5, the coupler 12 second end is adapted to be combined with a collar 10. The collar 10 is permanently secured to an auger 14 by welding or other suitable means. As shown in FIG. 2, the second end of the several couplers 12,12 a generally has the same geometry regardless of the differing geometry on their first ends. This allows all the couplers 12, 12 a in the system to combine with a single collar 10 geometry. In other words, a single auger 14 can be used with drive shafts having different geometries 28, 28 a by using different couplers 12, 12 a to combine the auger 14 with the drive shaft 28, 28 a.

The means for attaching the collar 10 with the coupler 12 includes interlocking the components 10, 12 so that the coupler 12 is capable of directly engaging and rotating the collar 10 (without exerting torque on a fastening member 22). In the embodiment shown, the interlocking attachment means is generally internal on both components 10, 12 thereby increasing safety since external components are minimized. As shown best in FIGS. 1(A), 1(B), and 5, the coupler 12 is removably secured to the collar 10 using a lug member 20 received into a recessed opening 24. In the embodiments shown, the lug member 20 extends outward from the coupler 12 and is received into a recessed opening 24 in the collar 10. However, in other embodiments, the lug member 20 may extend outward from the collar 10 and the recessed opening 24 may be in the coupler 12.

After the lug member 20 is received into the recessed opening 24, the components 10, 12 are rotated relative to each other until the lug member 20 is received into the coupler engagement area 25. In one embodiment, the coupler engagement area 25 has a top wall 26 and an end wall 27. The lug member 20 engages the top wall 26 and end wall 27 in the event the coupler 12 is moved upward or rotated in the forward direction, respectively. As shown best by circled area AA in FIG. 5, in the forward (clockwise) direction rotational torque is exerted on the collar 10 by the coupler 12 through direct contact between the lug member 20 and the end wall 27 of the collar's 10 coupler engagement area 25. There are no fasteners, pins, or other removable components used to transfer torque between the components.

A fastening member 22 is used to help secure the coupler 12 to the collar 10. In normal forward operation, however, no torque is transmitted through the fastening member 22. Any suitable fastening member 22 may be used including a screw, bolt, or locking fastener such as the one disclosed in U.S. Pat. No. 4,734,001, which is hereby incorporated by reference. As shown in FIG. 2, the collar 10 has an opening 32 adapted to receive the fastening member 22. As shown in FIG. 5, after the coupler 12 has been positioned in the collar 10, the fastening member 22 is then received and secured into the opening 32 in the collar 10. The fastening member 22 helps position and retain the lug member 20 in the engagement area 25 when the auger 14 is not being rotated in the forward direction. In one embodiment only the head of the fastening member 22 is visible on the outside of the collar 10. Preferably, the head of the fastening member 22 is flush with the outer surface of the collar 10 or recessed within the collar 10. This increases safety by not having a member protruding from the rotating components 10, 12. In the embodiment shown by circled area BB in FIG. 5, in the reverse (counter-clockwise) direction the lug member 20 exerts torque on fastening member 22 which causes the auger 14 to rotate in reverse. The amount of torque exerted in the reverse direction is typically much less than the torque that is exerted in the forward direction.

Figure 6:
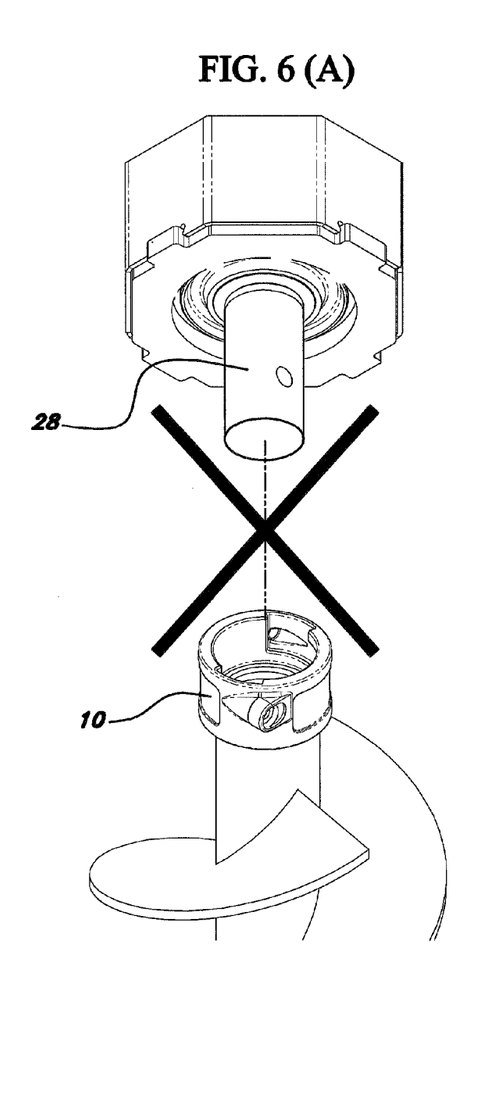
FIG. 6 is a perspective view showing an embodiment wherein a coupler is a necessary intermediate component used to combine the drive shaft with the auger.

As illustrated in FIGS. 6(A) and 6(B), the collar 10 and coupler 12 are combined using a geometry that is not compatible with any known output drive shaft 28. In other words, as illustrated by "X" in FIG. 6(A), the collar 10 is not capable of direct connection with the output drive shaft 28 because of the unique connection means between the collar 10 and the coupler 12, 12a (i.e. lug member 20 and recessed opening 24). A coupler 12, 12a is required as an intermediate member between the drive shaft 28 and the auger 14.

Figure 4:
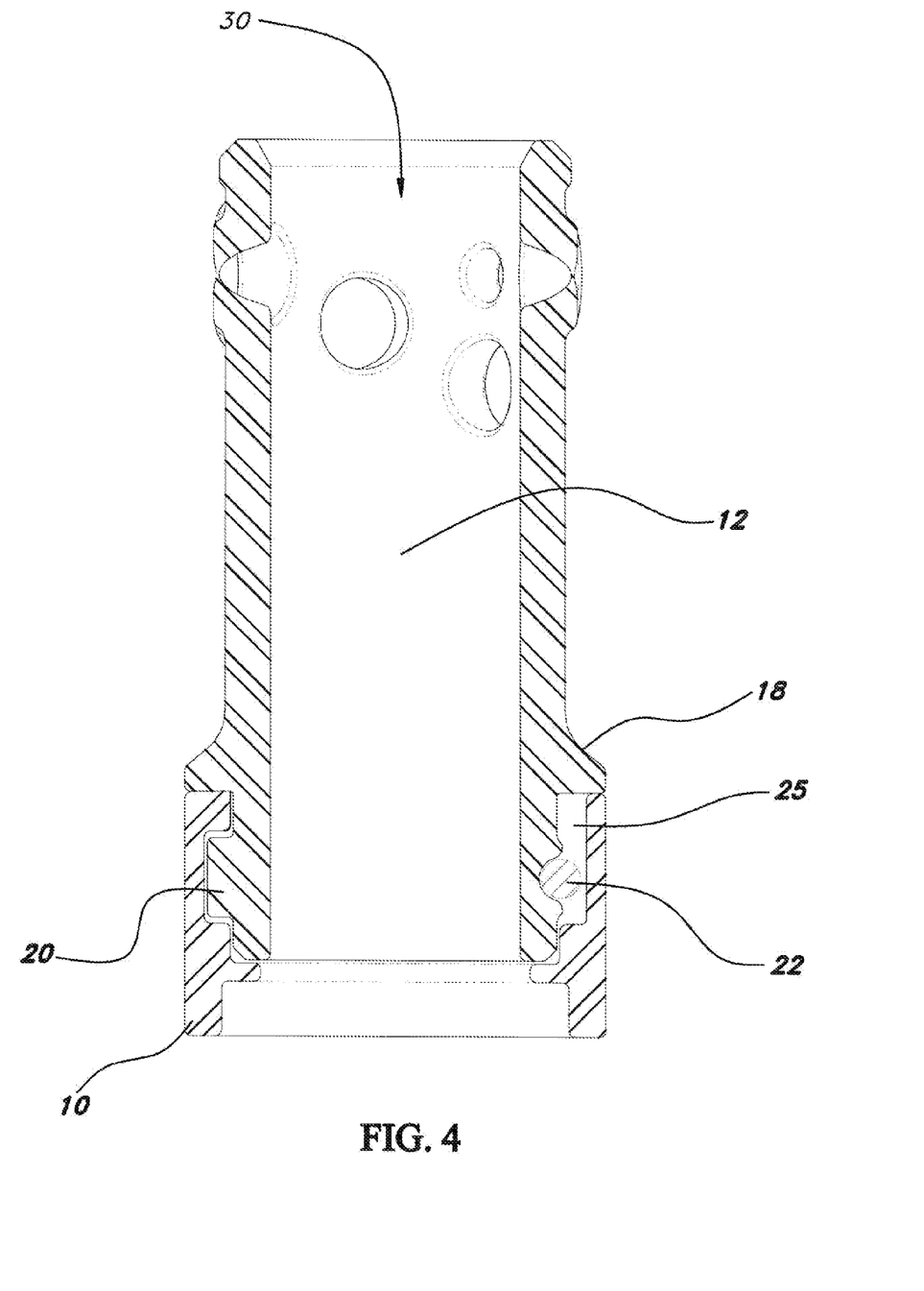
FIG. 4 is a section view taken along line A-A of FIG. 3.

During drilling operations, it is often necessary for the work vehicle to exert upward or downward force on the auger 14 to push it into a hole or pull it out of a hole. As best shown in FIG. 4, the downward force is transferred from the coupler 12 to the collar 10 by direct contact between those two components (i.e. without transferring force through the fasteners). Downward force may be transferred from the lip or shoulder 18 of the coupler 12 to the top wall 26 of the collar 10. As shown in FIG. 4, upward force may be transferred through the lug member 20 to the top wall 26 of the coupler engagement area 25.

Figure 8:
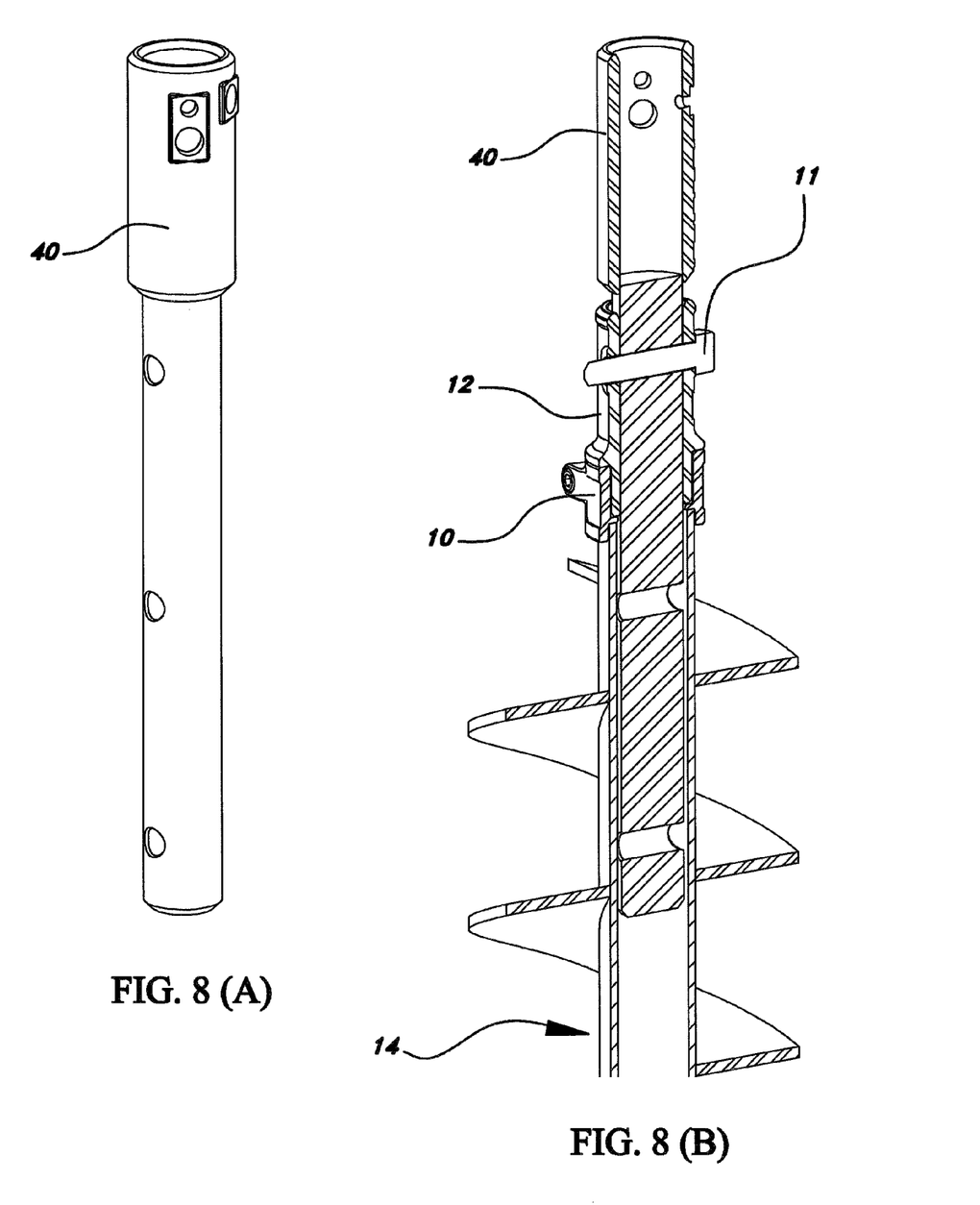
FIG. 8(A) is a perspective view showing an extension attachment.
FIG. 8(B) is a section view showing an extension attachment telescoped inside the shaft of an auger.

As shown in FIG. 4, in some embodiments the opening 30 in the top of the coupler 12 continues through the entire coupler 12 and collar 10. This is beneficial if the user wants to use a telescoping or extension attachment 40 (FIG. 8(A) to be nested inside the shaft 16 of the auger 14 (FIG. 8(B)).

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. An auger attachment system comprising:
a coupler having a first end, a second end, and an opening having a shape and size to receive a drive shaft or an extension attachment, wherein the opening extends from the first end to the second end;
an auger having a collar for removably combining with the second end of the coupler such that either the coupler or the collar have a lug member and the other of the coupler or the collar have a recessed opening with an engagement area, wherein the collar has a first end, a second end, and an opening having a shape and size to allow the extension attachment to pass through the entire collar into the auger, wherein the opening extends from the first end to the second end;
wherein said engagement area is adapted to receive the lug member so that force is communicated from the coupler to the collar through the lug member's engagement with the engagement area;
wherein said engagement area has a top wall and an end wall, said top wall and end wall adapted to help secure the lug member within the engagement area;
wherein said end wall is spaced apart from the recessed opening allowing the lug member to rotate relative to the engagement area until the lug member engages the end wall.

2. An auger attachment system comprising:
a coupler having a first end, a second end, an opening having a shape and size to receive a drive shaft or an extension attachment, and a lug member, wherein the opening extends from the first end to the second end, wherein the lug member protrudes from the second end;
an auger having a collar for receiving the second end of the coupler, said collar having an inner surface, an engagement area, a first end, a second end, and an opening having a shape and size to allow the extension attachment to pass through the entire collar into the auger, wherein the opening extends from the first end to the second end;
wherein said engagement area is adapted to receive the lug member so that force is communicated from the coupler to the collar through the lug member's engagement with the engagement area;
wherein said engagement area has a top wall with a recessed opening and an end wall, said top wall and end wall adapted to help secure the lug member within the engagement area;
wherein said end wall is spaced apart from the recessed opening around the inner surface allowing the lug member to rotate relative to the engagement area until the lug member engages the end wall.

3. The auger of claim 2 wherein rotational torque in the forward direction is communicated from the lug member to the end wall of the engagement area.

4. The auger of claim 2 wherein upward movement is communicated from the lug member to the top wall of the engagement area.

5. The auger of claim 2 wherein the coupler has a shoulder and the collar has a top wall, and wherein downward movement is communicated from the shoulder of the coupler to the top wall of the collar.

6. The auger of claim 2 wherein rotational torque is communicated from the coupler to the auger by direct contact between components.

7. The auger of claim 2 wherein rotational torque is communicated from the coupler to the auger without using any removable fasteners to communicate the torque.

8. The auger of claim 2 further comprising a fastening member to secure the lug member in the engagement area.

9. The auger of claim 8 wherein the collar has an outer surface and the fastening member is flush with the outer surface of the collar.

10. The auger of claim 2 wherein the components are reversed such that the lug member extends outward from the collar and the recessed opening is in the coupler.

11. The auger of claim 2 wherein the collar is welded to the auger.

12. An auger attachment kit comprising:
 a first coupler having a first end, a second end, and an opening having a shape and size to receive a drive shaft having a first geometry;
 a second coupler having a first end, a second end, and an opening having a shape and size to receive a drive shaft having a second geometry;
 a collar permanently secured to an auger, said collar having first end, a second end, and an opening adapted to receive the second end of the first coupler and the second coupler, wherein the opening has a shape and size to allow an extension attachment to pass through the entire collar into the auger, wherein the opening extends from the first end to the second end.

13. The kit of claim 12 wherein the second end of the first and second coupler further comprises a lug member extending outwardly therefrom.

14. The kit of claim 13 wherein the collar further comprises a recessed opening having an engagement area adapted to receive the lug member.

15. The kit of claim 14 wherein the engagement area has a top wall and an end wall.

16. The kit of claim 14 further comprising a fastening member to secure the lug member in the engagement area.

17. The kit of claim 16 wherein the collar has an outer surface and the fastening member is flush with the outer surface of the collar.

18. The kit of claim 15 wherein rotational torque in the forward direction is communicated from the lug member to the end wall of the engagement area.

19. The kit of claim 15 wherein upward movement is communicated from the lug member to the top wall of the engagement area.

20. The kit of claim 15 wherein the coupler has a shoulder and the collar has a top wall, and wherein downward movement is communicated from the shoulder of the coupler to the top wall of the collar.

21. The kit of claim 12 wherein rotational torque is communicated from either the first coupler or the second coupler to the auger by direct contact between either the first coupler or the second coupler and the collar.

22. The kit of claim 12 wherein the collar further comprises a lug member extending outwardly therefrom; and
 wherein the second end of the first and second coupler further comprises a recessed opening having an engagement area adapted to receive the lug member.

* * * * *